US005726218A

United States Patent [19]

Jeong et al.

[11] Patent Number: 5,726,218

[45] Date of Patent: Mar. 10, 1998

[54] PHOTO-CONDUCTIVE COMPOSITION AND CRT BULB HAVING PHOTO-CONDUCTIVE LAYER FORMED OF THE SAME

[75] Inventors: Bong-mo Jeong, Seoul; Min-ho Kim, Suwon; Jae-ho Shim, Seoul; Wan-woo Park, Yongin; Deuk-yong Yang, Suwon, all of Rep. of Korea

[73] Assignee: Samsung Display Devices Co., Ltd., Kyungki-do, Rep. of Korea

[21] Appl. No.: 707,475

[22] Filed: Sep. 4, 1996

[30] Foreign Application Priority Data

Dec. 29, 1995 [KR] Rep. of Korea .................... 95-66816

[51] Int. Cl.$^6$ .................... C08F 2/50

[52] U.S. Cl. .................... 522/75; 428/195; 522/110

[58] Field of Search .................... 428/195; 522/75, 522/110

[56] References Cited

U.S. PATENT DOCUMENTS 5,180,705 1/1993 Smith .................... 428/195
5,460,874 10/1995 Rao .................... 428/195

FOREIGN PATENT DOCUMENTS 067954 5/1981 European Pat. Off. .

*Primary Examiner*—Paul R. Michl
*Attorney, Agent, or Firm*—Leydig, Voit & Mayer, Ltd.

[57] ABSTRACT

A photo-conductive composition and CRT bulb having a photoconductive layer formed of the same are provided. The photo-conductive composition comprises 5–15 wt % of a charge transmitting substance, represented by the structural formula (1)

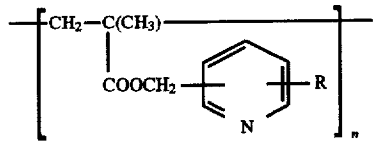

1 where R is selected from the group consisting of hydrogen, $C_1$–$C_{10}$ linear alkyl or branched alkyl, halogen, alkylamino ($NR_1$), alkylester ($COOR_1$) and α-cyanomethyl alkylketone ($CH(CN)COR_2$), $R_1$ and $R_2$ being selected from the group consisting of $C_1$–$C_{10}$ alkyl, aryl, $C_1$–$C_{10}$ alkoxy and aryloxy, and n is an integer between 500 and 1000;

1–15 wt % of a charge generating substance which absorbs light in the wavelength range of an ultraviolet region;

70–93.95 wt % of a binder; and 0.05–1 wt % of a surfactant. The photo-conductive composition exhibits excellent sintering characteristic and can form a photoconductive layer having excellent sensitivity, durability and luminance.

6 Claims, No Drawings

PHOTO-CONDUCTIVE COMPOSITION AND CRT BULB HAVING PHOTO-CONDUCTIVE LAYER FORMED OF THE SAME

BACKGROUND OF THE INVENTION

The present invention relates to a photo-conductive composition and a cathode ray tube (CRT) bulb having a photo-conductive layer formed of the same, and more particularly, to a photo-conductive composition for forming a photoconductive layer having excellent sensitivity, durability and luminance, and a CRT bulb having a photo-conductive layer formed of the same.

A photo-conductive composition has been used in various fields applying electrophotographic technique, such as photocopiers and laser printers, and especially for the phosphor screen of a color cathode ray tube. Here, the phosphor screen of a cathode ray tube can be manufactured by a slurry coating method or an electrophotographic process.

In the slurry coating method, a panel is cleaned and then slurries of primary color (i.e., green, blue and red) emitting phosphors are respectively coated on the panel. Each phosphor slurry contains polyvinylalcohol (as its main component), ammonium dichromate and one of green-, blue-, and red-emitting phosphors. A predetermined portion of the coated panel is exposed through a shadow mask and developed, to give a phosphor screen in a dotted or striped pattern.

The above method, however, has certain problems. First, the phosphor remains at an unexposed portion in a relatively large amount after the developing step, so that the remaining phosphor is mixed with the phosphor to be coated later. Second, a reaction between the polyvinylalcohol and ammonium dichromate contained in the phosphor slurry produces a coloring substance, which deteriorates color purity.

As another method for manufacturing the phosphor screen for a cathode ray tube, a method using an electrophotographic technique is known. This method is not only simpler than the slurry method, but can also provide a color cathode ray tube having better luminance. In this method, a conductive layer is first formed on the inner surface of a panel using a spin coating method, and a photo-conductive layer is formed thereon. The photo-conductive layer is electrified with a corona charger, and a predetermined portion thereof is then exposed through a shadow mask. The exposed portion of the photo-conductive layer is controlled to have an electrically neutral condition, and green-, blue- and red phosphor compositions are respectively adhered to the unexposed portion thereof, to form a phosphor screen.

A photo-conductor includes a charge generating substance or material (CGM) and a charge transmitting substance or material (CTM). Thus, the photo-conductor behaves as an insulator in the dark, but exhibits electrical characteristics upon receiving light (UV or visible light), by releasing an electron or generating a hole.

An inorganic photo-conductor performs poorly in terms of sensitivity, thermal stability, durability and hygroresistance—besides being toxic—. Further, the inorganic photo-conductor generates a great amount of residue during a sintering process, resulting in a photo-conductive layer having poor luminance. Therefore, the inorganic photo-conductor is not used substantially. Accordingly, an organic photo-conductor has recently been developed. An organic photo-conductor is lightweight, transparent and easy to fire. However, the organic photo-conductor also exhibits a low electrification potential and poor charge generation and charge transmission ability.

In general, a photo-conductor composition comprises a charge generating substance, a charge transmitting substance and a binder. So far, polyvinylcarbazole is frequently used as the charge generating substance. However, polyvinylcarbazole has the following disadvantages. That is, its charge potential is low and the luminance of the resulting cathode ray tube is reduced since some residue remains after a sintering process. Also, polyvinylcarbazole absorbs light in a wavelength range of the visible region, so that a manipulation with polyvinylcarbazole should be achieved in a darkroom, which obstructs its applicability. In addition, solvents such as chlorobenzene and cyclopentanone used for dissolving polyvinylcarbazole are not preferable, in view of the environment, worker's health and solvent cost.

Other charge transmitting substances are disclosed in U.S. Pat. No. 5,370,952, but are difficult to prepare and are environmentally hazardous.

SUMMARY OF THE INVENTION

An object of the present invention is to provide a photo-conductive composition for forming a photoconductive layer having excellent sensitivity and durability, and luminance.

Another object of the present invention is to provide a cathode ray tube bulb having an enhanced luminance by adopting a photo-conductor layer formed from a photo-conductive composition having an excellent sintering characteristics.

To achieve the object, there is provided a photo-conductive composition comprising:

5–15 wt % of a charge transmitting substance, represented by the structural formula (1)

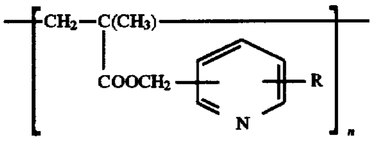

1 where R is selected from the group consisting of hydrogen, $C_1$–$C_{10}$ linear alkyl or branched alkyl, halogen, alkylamino ($NR_1$), alkylester ($COOR_1$) and α-cyanomethyl alkylketone ($CH(CN)COR_2$), $R_1$ and $R_2$ being selected from the group consisting of $C_1$–$C_{10}$ alkyl, aryl, $C_1$–$C_{10}$ alkoxy and aryloxy, and n is an integer between 500 and 1000;

1–15 wt % of a charge generating substance which absorbs light in a wavelength range of the ultraviolet region;

70–93.95 wt % of a binder; and 0.05–1 wt % of a surfactant.

The other object of the present invention is achieved by a CRT bulb comprising a face plate on which a conductive layer, a photo-conductive layer and a phosphor screen are sequentially formed, a funnel connected to the face plate and provided with an electron gun and a deflection yoke, wherein the photo-conductive layer is formed of a composition comprising:

5–15 wt % of a charge transmitting substance, represented by the structural formula (1)

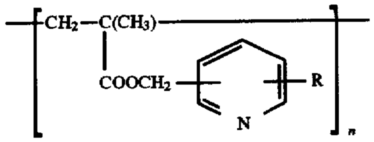

where R is selected from the group consisting of hydrogen, $C_1$–$C_{10}$ linear alkyl or branched alkyl, halogen, alkylamino ($NR_1$), alkylester ($COOR_1$) and α-cyanomethyl alkylketone ($CH(CN)COR_2$), $R_1$ and $R_2$ being selected from the group consisting of $C_1$–$C_{10}$ alkyl, aryl, $C_1$–$C_{10}$ alkoxy and aryloxy, and n is an integer between 500 and 1000;

1–15 wt % of a charge generating substance which absorbs light in a wavelength range of the ultraviolet region;

70–93.95 wt % of a binder; and 0.05–1 wt % of a surfactant.

DETAILED DESCRIPTION OF THE INVENTION

In the photo-conductive composition of the present invention, when considering the problem of luminance deterioration caused by a residue left after a sintering process, a polymer which has a good thermal decomposition properties and is represented by the structural formula (I) is used as the charge transmitting substance. The polymer compound is prepared by polymerizing a monomer (4) obtained by reacting a methacrylic acid derivative (2) with alkylpyrridinemethanol (3).

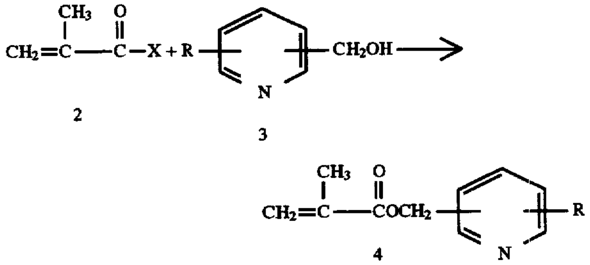

2

3

4

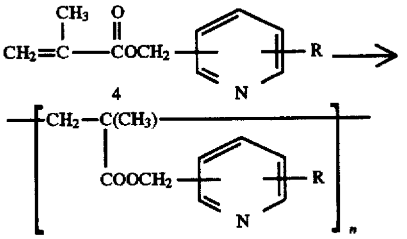

4

1 where X is a halogen such as chlorine and bromine, or an alkoxy group such as methoxy and ethoxy, and R and n have the same meaning as mentioned above.

The above reaction will be described in detail, taking the reaction between methacryloyl chloride and 2-pyridinemethanol, as an example.

Methacryloyl chloride is added to a solution of 2-pyrridinemethanol in dioxane at the temperature of 5°–10° C. in the presence of a base such as pyridine. It is important that the methacryloyl chloride should be slowly added to 2-pyridinemethanol, to prevent a side reaction.

After the reaction is completed, dioxan is evaporated. The remaining product is extracted with hexane, washed with water several times, and filtered and dried, and then evaporated at reduced pressure.

In this method, 2-pyridinemethyl methacrylate is obtained in a 70–93.95% yield.

Since the obtained monomer is spontaneously polymerized at room temperature, without time delay, the radical polymerization of the monomer should be accomplished to prepare poly-2-pyridinemethyl methacrylate.

This polymer compound has excellent charge transmitting ability and is very soluble in an usual organic solvent, for instance, chloroform, methylene chloride, THF, DMF, N-methyl-2-pyrrolidone or toluene. Also, since the polymer absorbs light in an ultraviolet region of the wavelength range, there is an advantage of workability under a yellow light (light having wavelength of 560–580 nm in the visible region).

Substances used as a charge generating substance absorb light in the wavelength range of an ultraviolet region and includes 3,5-dinitrobenzonitrile (5), 2,6-dichlroquinone-N-chloroimide (6), 2,6-dibromoquinone-N-chloroimide (7), mordant orange 1 (8), 3,3',4,4'-benzophenone tetracarboxylic dianhydride (9), and crystal violet lactone (10).

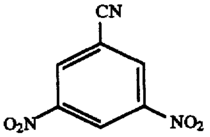

5

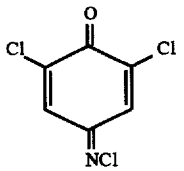

6

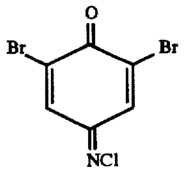

7

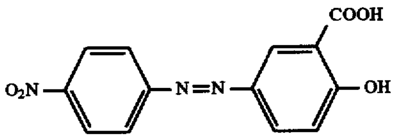

8

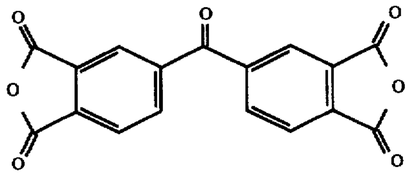

9

-continued

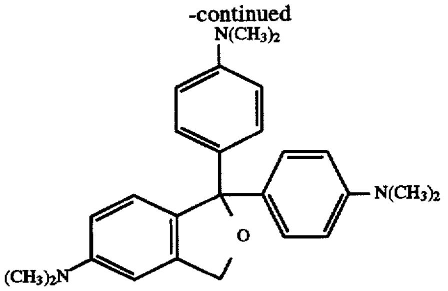

As the binder, polymethylmethacrylate, polycarbonate, polybutylmethacrylate or polystyrene is used.

Preferably, in coating a photo-conductive composition on the inner surface of a panel, a surfactant is added to the composition in a small amount, to reduce surface tension of the composition. Silicon silar 100 or pluronic P-84 is mainly used as the surfactant.

The solvent used for a photo-conductive composition includes chloroform, methylenechloride, acetone, toluene, cyclohexanone and cyclopentanone.

Hereinbelow, as an example for using the photo-conductive composition of the present invention, a method for manufacturing a phosphor screen of a color cathode ray tube by an electrophotographic technique will be described.

First, an inner surface of a panel of a cathode ray tube is cleaned and a conductive composition is coated thereon, to form a conductive layer. As conductors for forming the conductive layer, an inorganic conductor such as tin oxide, indium oxide and indium tin oxide, or an organic conductor such as a quaternary ammonium salt is used. Considering a thermal decomposition property during a sintering process, the organic conductor is preferably used.

The photo-conductive composition, comprising 5–15 wt % of a charge transmitting substance represented by the structural formula (1), 1–15 wt % of a charge generating substance which absorbs light in a wavelength range of the ultraviolet region, 70–93.95 wt % of a binder and 0.05–1 wt % of a surfactant, is coated on the conductive layer, to form a photo-conductive layer having a thickness of 2–6 μm. Preferably, to prevent swelling of an aluminum layer after a sintering process, the photo-conductive layer should be formed in a thickness not exceeding 6 μm.

The photo-conductive layer is electrified with a corona charger and a predetermined portion thereof is exposed through a shadow mask. The exposed portion of the photo-conductive layer is controlled to be in an electrically neutral condition, and green-, blue- and red emitting phosphor compositions are adhered to the unexposed portion thereof, respectively. The phosphors are semi-solidified by using a highly-volatile solvent such as acetone and alcohol. The phosphors are completely fused on the resulting panel of the cathode ray tube by using an infrared heater, to thereby form a phosphor screen.

Hereinbelow, the present invention is described more concretely with respect to examples intended to illustrate the instant invention without limiting the scope thereof.

(EXAMPLE 1)

After an inner surface of a panel was cleaned and a conductive layer was formed thereon. A photo-conductive composition, comprising 15 g of poly-2-pyridinemethyl methacrylate, 10 g of 3,5-dinitrobenzonitrile, 100 g of polymethylmethacrylate, 1 g of silicon silar 100 and 700 g of toluene, was coated on the photo-conductive layer, to form a photo-conductive layer having a thickness of about 4 μm. The photo-conductive layer was electrified with a corona charger, to achieve a surface potential between 200 V and 600 V.

A predetermined portion of the photo-conductive layer was exposed through a photo mask. The exposed portion of the photo-conductive layer was controlled to be in an electrically neutral condition, and green-, blue- and red phosphor compositions were adhered to the unexposed portion thereof, respectively. The phosphors were semi-solidified by using acetone as a solvent and completely fused on the resulting panel of the cathode ray tube by heating at 70° C. for twenty seconds, with an infrared heater, to form a phosphor screen.

(EXAMPLE 2)

A phosphor screen was formed using the same method as described in Example 1 except that a photo-conductive composition comprising 15 g of poly-2-pyridine methylmethacrylate, 10 g of mordant orange 1, 100 g of polymethylmethacrylate, 1 g of silicon silar 100 and 900 g of toluene was used.

(EXAMPLE 3)

A phosphor screen was formed using the same method as described in Example 1 except that a photo-conductive composition comprising 10 g of poly-2-pyridinemethyl methacrylate, 5 g of mordant orange 1, 100 g of polystyrene, 1 g of silicon silar 100 and 900 g of toluene was used.

(Comparative Example 1)

An inner surface of a panel was cleaned, and a conductive layer was then formed thereon. Thereafter, a photo-conductive composition comprising 200 g of polyvinylcarbazole, 10 g of polymethylmethacrylate, 1 g of celestin blue and 3800 g of chlorobenzene was coated on the conductive layer, to thus form a layer having a thickness of about 4 μm.

The predetermined portion of the photo-conductive layer was exposed through a shadow mask. The exposed portion of the photo-conductive layer was controlled to be an electrically neutral condition, and green-, blue- and red phosphor compositions were respectively adhered to the unexposed portion thereof, to form a phosphor screen.

(Comparative Example 2)

A phosphor screen was formed using the same method as described in Comparative Example 1 except for using a photo-conductive composition comprising 300 g of polystyrene, 50 g of 1,4-diphenyl-1,4-diphenylbutatriene, 2.5 g of 2,4,7-trinitro-9-fluorenone, 0.15 g of silicon silar 100 and 2648 g of toluene.

Photo-conductive compositions of examples and comparative examples were coated on the inner surface of a panel, respectively and then sintered, and the result was investigated in each case. In the comparative examples, a great amount of residue was left after the sintering process, however, in the examples, the amount of residue was decreased. And, the residual potential of the examples had the value of 50 V or lower during repeated electrification and exposure.

The present invention has the following advantages.

First, a photo-conductive composition according to the present invention has excellent sensitivity and durability and prevents the deterioration of luminance of a cathode ray tube by reducing the amount of residue left after a sintering process.

Second, mass production is possible due to workability under a yellow light.

Third, in the photo-conductive composition according to the present invention, the usual organic solvents can be used, and the problems resulting from the use of polluting organic solvents can be solved.

What is claimed is:

1. A photo-conductive composition comprising:

5–15 wt % of a charge transmitting substance, represented by the structural formula (1)

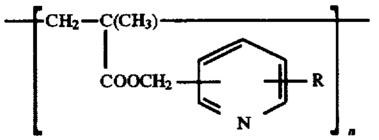

1 where R is selected from the group consisting of a hydrogen atom, a $C_1$–$C_{10}$ linear alkyl or branched alkyl group, a halogen atom, an alkylamino group ($NR_1$), an alkylester group ($COOR_1$) and an α-cyanomethyl alkylketone group ($CH(CN)COR_2$), $R_1$ and $R_2$ being selected from the group consisting of a $C_1$–$C_{10}$ alkyl group, an aryl group, a $C_1$–$C_{10}$ alkoxy group and an aryloxy group, and n is an integer between 500 and 1000;

1–15 wt % of a charge generating substance which absorbs light in a wavelength range of the ultraviolet region;

70–93.95 wt % of a binder; and 0.05–1 wt % of a surfactant.

2. A photo-conductive composition as claimed in claim 1 wherein said charge generating substance is one compound selected from the group consisting of 3,5-dinitrobenzonitrile, 2,6-dichlroquinone-N-chloroimide, 2,6-dibromoquinone-N-chloroimide, mordant orange 1, 3,3',4,4'-benzophenone tetracarboxylic dianhydride and crystal violet lactone.

3. A photo-conductive composition as claimed in claim 1 wherein said binder is one compound selected from the group consisting of polymethylmethacrylate, polycarbonate, polybutylmethacrylate and polystyrene.

4. A CRT bulb comprising a face plate on which a conductive layer, a photo-conductive layer and a phosphor screen are sequentially formed, a funnel connected to said face plate and provided with an electron gun and a deflection yoke, wherein said photo-conductive layer is formed of a composition comprising:

5–15 wt % of a charge transmitting substance, represented by the structural formula (1)

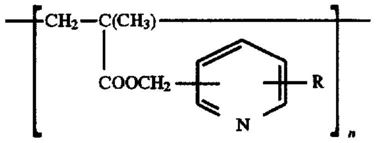

1 where R is selected from the group consisting of a hydrogen atom, a $C_1$–$C_{10}$ linear alkyl or branched alkyl group, a halogen atom, an alkylamino group ($NR_1$), an alkylester group ($COOR_1$) and an α-cyanomethyl alkylketone group ($CH(CN)COR_2$), $R_1$ and $R_2$ being selected from the group consisting of a $C_1$–$C_{10}$ alkyl group, an aryl group, a $C_1$–$C_{10}$ alkoxy group and an aryloxy group, and n is an integer between 500 and 1000;

1–15 wt % of a charge generating substance which absorbs light in the wavelength range of an ultraviolet region;

70–93.95 wt % of a binder; and 0.05–1 wt % of a surfactant.

5. A CRT bulb as claimed in claim 4 wherein said charge generating substance is one compound selected from the group consisting of 3,5-dinitrobenzonitrile, 2,6-dichlroquinone-N-chloroimide, 2,6-dibromoquinone-N-chloroimide, mordant orange 1, 3,3',4,4'-benzophenone tetracarboxylic dianhydride and crystal violet lactone.

6. A CRT bulb as claimed in claim 4 wherein said binder is one compound selected from the group consisting of polymethylmethacrylate, polycarbonate, polybutylmethacrylate and polystyrene.

* * * * *